US012030161B2

(12) United States Patent
Murui et al.

(10) Patent No.: US 12,030,161 B2
(45) Date of Patent: Jul. 9, 2024

(54) ELECTRIC TOOL

(71) Applicant: Panasonic Intellectual Property Management Co., Ltd., Osaka (JP)

(72) Inventors: Itaru Murui, Nara (JP); Kotaro Momoeda, Mie (JP); Kota Kitamura, Mie (JP); Naoki Tsujimoto, Mie (JP); Akito Nakamura, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 198 days.

(21) Appl. No.: 17/766,899

(22) PCT Filed: Sep. 18, 2020

(86) PCT No.: PCT/JP2020/035458
§ 371 (c)(1),
(2) Date: Apr. 6, 2022

(87) PCT Pub. No.: WO2021/070596
PCT Pub. Date: Apr. 15, 2021

(65) Prior Publication Data

US 2023/0120149 A1 Apr. 20, 2023

(30) Foreign Application Priority Data

Oct. 9, 2019 (JP) ................................ 2019-186369

(51) Int. Cl.

| | |
|---|---|
| ***B25B 23/147*** | (2006.01) |
| ***B25B 21/02*** | (2006.01) |
| ***B25F 5/00*** | (2006.01) |

(52) U.S. Cl.
CPC ........... *B25B 23/147* (2013.01); *B25B 21/02* (2013.01); *B25F 5/001* (2013.01)

(58) Field of Classification Search
CPC ........ B25B 23/147; B25B 21/02; B25F 5/001
See application file for complete search history.

(56) References Cited

U.S. PATENT DOCUMENTS

| | | | |
|---|---|---|---|
| 4,487,270 | A | 12/1984 | Huber |
| 7,878,090 | B2 | 2/2011 | Leupert |

(Continued)

FOREIGN PATENT DOCUMENTS

| | | | |
|---|---|---|---|
| EP | 3 230 010 | A1 | 6/2016 |
| JP | 2000-246660 | A | 9/2000 |

(Continued)

OTHER PUBLICATIONS

International Search Report dated Nov. 17, 2020 issued in International Patent Application No. PCT/JP2020/035458, with English translation.

(Continued)

*Primary Examiner* — Andrew M Tecco
*Assistant Examiner* — Nicholas E Igbokwe
(74) *Attorney, Agent, or Firm* — Rimon P.C.

(57) ABSTRACT

An electric tool includes an output shaft and a controller. The output shaft is configured to hold a tip tool and be rotated by motive power provided from an electric motor with the output shaft holding the tip tool. The controller is configured to control rotation of the output shaft in accordance with pressing force in a direction from a tip end of the tip tool toward the output shaft. The electric tool has, as an operation range, a restriction range in which rotation of the output shaft is restricted in a state where the pressing force is less than or equal to a prescribed value.

12 Claims, 8 Drawing Sheets

(56) References Cited

U.S. PATENT DOCUMENTS

| | | | |
|---|---|---|---|
| 9,278,437 B2 | 3/2016 | Rakaczki et al. | |
| 10,797,622 B2 | 10/2020 | Hikawa | |
| 10,850,377 B2 | 12/2020 | Steurer | |
| 2011/0185864 A1* | 8/2011 | Ide | B23P 19/066 81/479 |
| 2012/0191250 A1 | 7/2012 | Iwata et al. | |
| 2015/0122523 A1* | 5/2015 | Yamamoto | B25F 5/001 173/2 |
| 2015/0201918 A1 | 7/2015 | Kumar et al. | |
| 2015/0273645 A1 | 10/2015 | Steurer | |
| 2015/0273671 A1* | 10/2015 | Totsu | B25B 23/141 173/1 |
| 2016/0207178 A1* | 7/2016 | Chen | B25B 13/481 |
| 2019/0283230 A1* | 9/2019 | Sakakibara | B25B 21/00 |
| 2020/0070325 A1* | 3/2020 | Miyazaki | B25B 21/00 |
| 2020/0122311 A1 | 4/2020 | Tsuruta et al. | |

FOREIGN PATENT DOCUMENTS

| | | | |
|---|---|---|---|
| JP | 2004-230478 A | 8/2004 | |
| JP | 2011-016210 A | 1/2011 | |
| JP | 2014-104541 A | 6/2014 | |
| JP | 2015-058517 A | 3/2015 | |
| JP | 2015058517 A * | 3/2015 | B25F 5/00 |
| JP | 2015-160302 A | 9/2015 | |
| JP | 2018-111187 A | 7/2018 | |
| JP | 2019-150897 A | 9/2019 | |
| JP | 2019-155533 A | 9/2019 | |
| KR | 101430931 B1 | 8/2014 | |
| NL | 1026604 C1 | 1/2006 | |

OTHER PUBLICATIONS

International Search Report dated Dec. 15, 2020 issued in International Patent Application No. PCT/JP2020/035459, with English translation.

Extended European Search Report dated Sep. 21, 2022 issued in the corresponding European Patent Application No. 20874093.6.

Extended European Search Report dated Oct. 6, 2022 issued in the corresponding European Patent Application No. 20875262.6.

Non-Final Office Action dated May 10, 2023 issued in U.S. Appl. No. 17/766,914.

* cited by examiner

ELECTRIC TOOL

CROSS-REFERENCE OF RELATED APPLICATIONS

This application is the U.S. National Phase under 35 U.S.C. § 371 of International Patent Application No. PCT/JP2020/035458, filed on Sep. 18, 2020, which in turn claims the benefit of Japanese Patent Application No. 2019-186369, filed on Oct. 9, 2019, the entire disclosures of which Applications are incorporated by reference herein.

TECHNICAL FIELD

The present disclosure generally relates to electric tools. The present disclosure specifically relates to an electric tool including an output shaft configured to hold a tip tool and be rotated by motive power provided from an electric motor with the output shaft holding the tip tool.

BACKGROUND ART

Patent Literature 1 describes a speed controllable rotary tool configured to control a rotational speed without being provided with a trigger or a switch. The speed controllable rotary tool includes a piezoelectric element disposed at the back of a bit attachment hole in the output shaft. A rear end of a bit fit into the bit attachment hole is pressed against a front surface of the piezoelectric element. As a result, the resistance value of the piezoelectric element changes. The resistance value is detected by a pressing force detector to control the rotational frequency of the motor. In this way, the pressure applied to the bit is adjusted to control the rotational speed of the bit.

CITATION LIST

Patent Literature

Patent Literature 1: JP 2000-246660 A

SUMMARY OF INVENTION

In the speed controllable rotary tool described in Patent Literature 1, the rotational speed may increase, that is, the bit (tip tool) may start rotating, immediately in response to generation of force pressing the bit. This may be inconvenient to users.

In view of the foregoing, it is an object of the present disclosure to provide an electric tool with improved convenience.

An electric tool of an aspect of the present disclosure includes an output shaft and a controller. The output shaft is configured to hold a tip tool and be rotated by motive power provided from an electric motor with the output shaft holding the tip tool. The controller is configured to control rotation of the output shaft in accordance with pressing force in a direction from a tip end of the tip tool toward the output shaft. The electric tool has, as an operation range, a restriction range in which the rotation of the output shaft is restricted in a state where the pressing force is less than or equal to a prescribed value.

DESCRIPTION OF EMBODIMENTS

(1) Overview

Note that the drawings to be referred to in the following description of embodiments are all schematic representations. That is to say, the ratio of the dimensions (including thicknesses) of respective constituent elements illustrated on the drawings does not always reflect their actual dimensional ratio.

Figure 1:
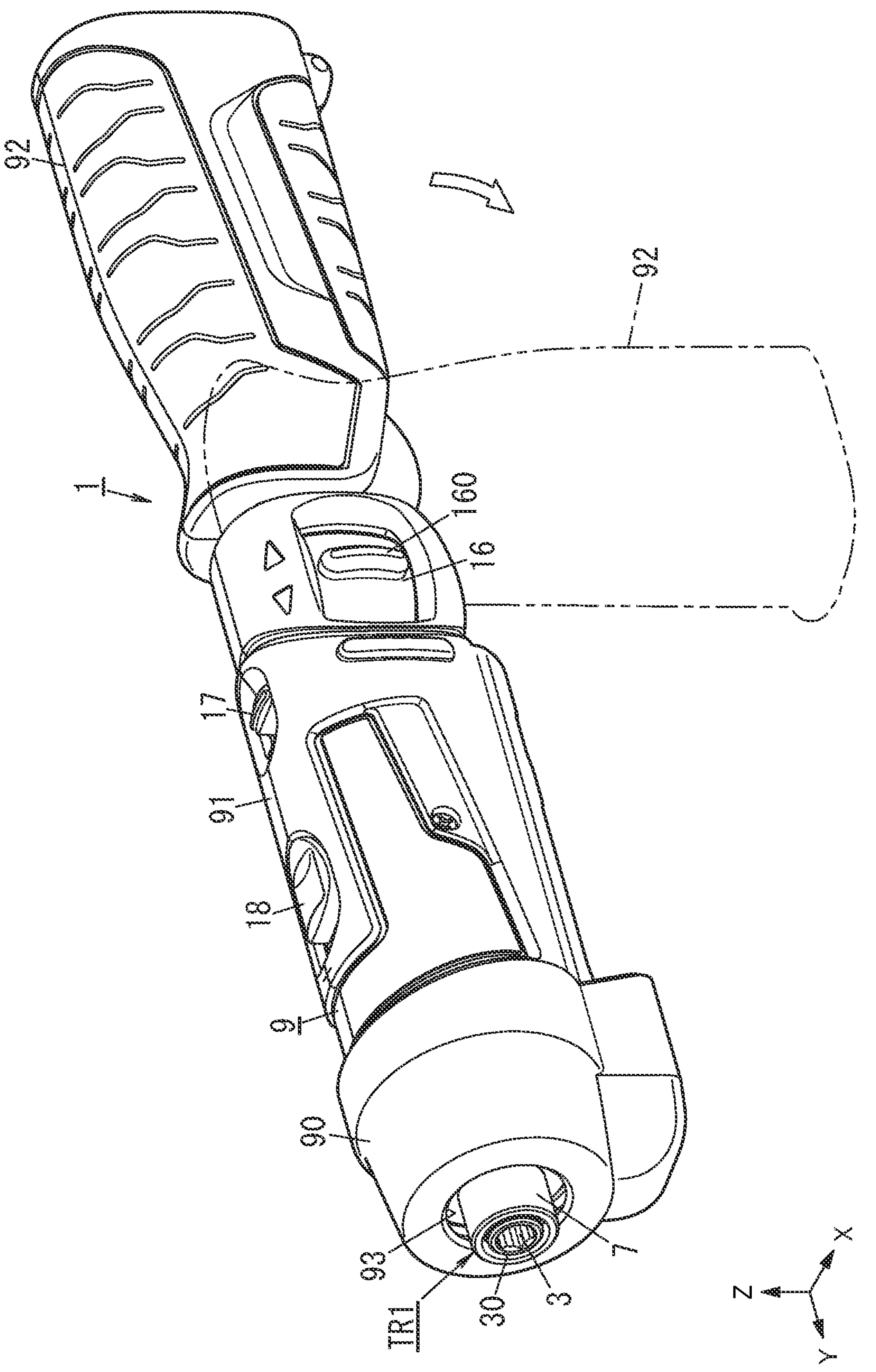
FIG. 1 is an exterior perspective view of an electric tool of an embodiment when viewed from above.
Figure 2:
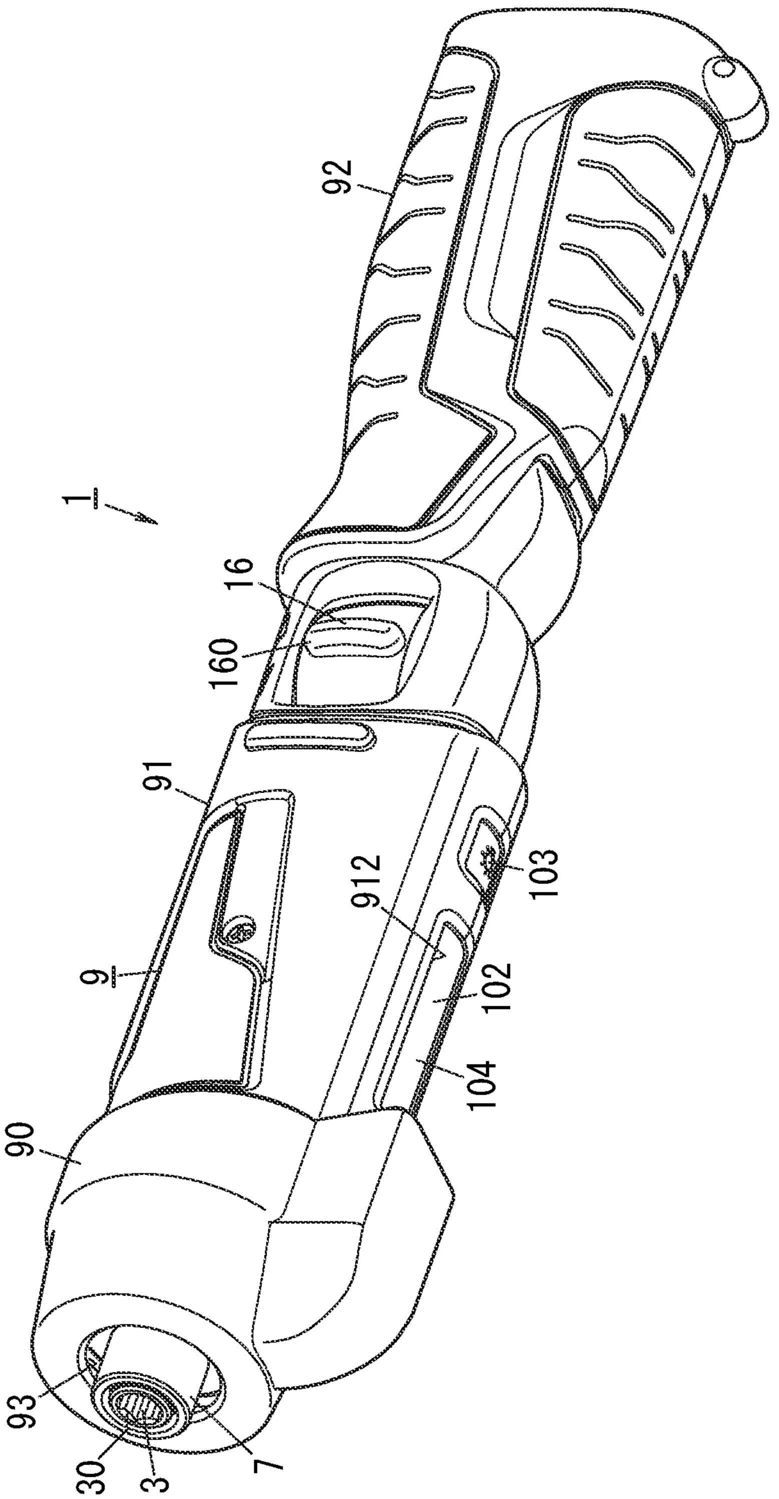
FIG. 2 is an exterior perspective view of the electric tool of the embodiment when viewed from below.
Figure 3:
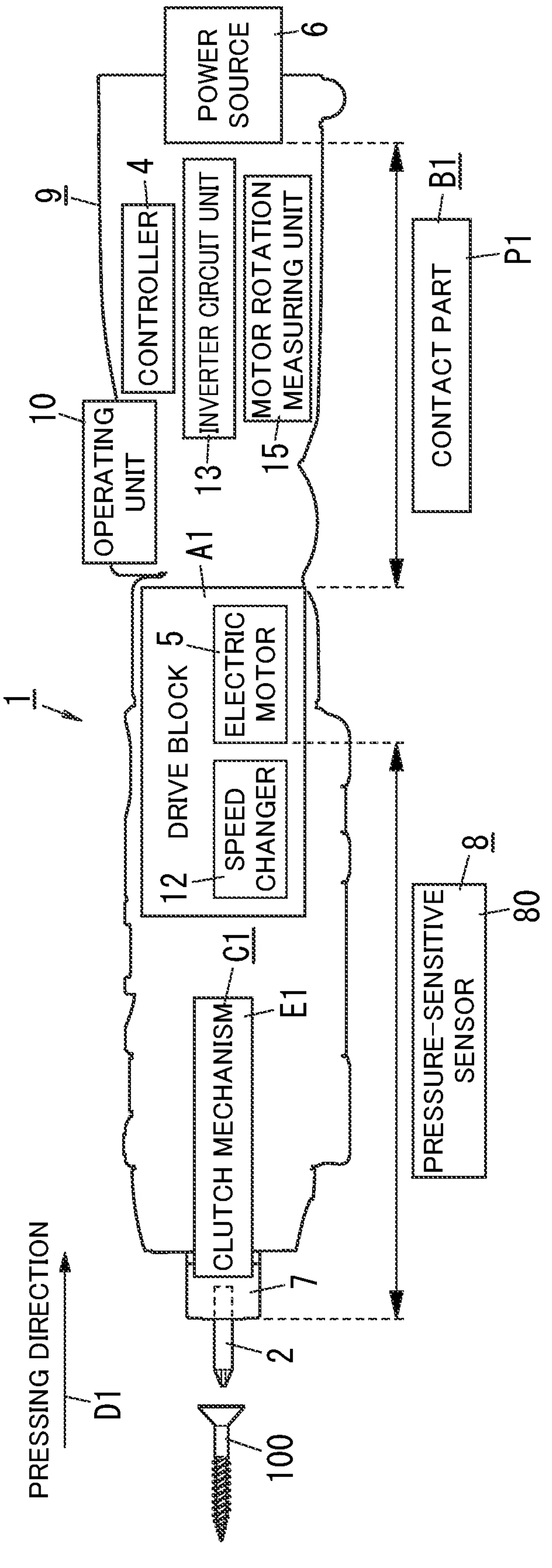
FIG. 3 is a schematic block diagram of the electric tool.

As shown in FIGS. 1 to 3, an electric tool 1 according to the present embodiment is, for example, a tool to be used in a factory, a construction site, or the like. In this embodiment, the electric tool 1 is assumed to be, for example, an electrically driven screw driver (a rotary tool) used to tighten a work target 100 (a tightening member such as a bolt or a screw) as shown in FIG. 3. Note that the type of the electric tool 1 is not particularly limited, but the electric tool 1 may be, for example, an impact driver (rotary impact tool).

The electric tool 1 according to the present embodiment includes an output shaft 3 (see FIG. 4) and a controller 4 (see FIG. 3). The output shaft 3 holds a tip tool 2 (see FIG. 3), and in this state, the output shaft 3 is rotated by motive power provided from an electric motor 5 (see FIG. 3). The controller 4 controls rotation of the output shaft 3 in accordance with pressing force in a direction from a tip end of the tip tool 2 toward the output shaft 3 (see FIG. 3: pressing direction D1).

In this embodiment, the electric tool 1 has, as an operation range, a restriction range R0 (see FIG. 8) in which the rotation of the output shaft 3 is restricted in a state where the pressing force is less than or equal to a prescribed value.

With this configuration, the electric tool 1 has the restriction range R0, and therefore, even when force pressing the tip tool 2 is generated, the possibility that the tip tool 2 immediately starts rotating is reduced. Thus, convenience can be improved.

(2) Details

(2.1) Overall Structure

With reference to FIGS. 1 to 8, the overall structure of the electric tool 1 according to the present embodiment will be described in detail. Note that in the following description, a person who tightens a work target 100 by using the electric tool 1 may simply be referred to as a “user”.

Moreover, in the following description of the electric tool 1, a direction along the X-axis in FIG. 1 is defined as the left/right direction, and the positive direction of the X-axis is defined as the right direction. A direction along the Y-axis is defined as the forward/backward direction, and the positive direction of the Y-axis is defined as the frontward direction. A direction along the Z-axis is defined as the up/down direction, and the positive direction of the Z-axis is defined as the upward direction. Note that these directions are mere examples and are not to limit the direction of the electric tool 1 in use. Additionally, the arrows representing the directions in FIG. 1 are described only for facilitating understanding and are intangible.

As shown in FIG. 3, the electric tool 1 includes a drive block A1, a clutch mechanism E1, the tip tool 2, the controller 4, a chuck 7, a sensing unit 8, and a housing 9. As shown in FIG. 1, the electric tool 1 further includes a power source 6 (see FIG. 3), a pair of switches 16 (only a switch 16 on the right side is shown in FIG. 1), a lock button 17, and a gear change button 18. The electric tool 1 further includes a first light source 101 (see FIGS. 4 to 7A), a second light source 102 (see FIG. 2), and a light button 103 (see FIG. 2). The electric tool 1 further includes a support block 11 (see FIG. 4), an inverter circuit unit 13 (see FIG. 3), and a clutch handle 14 (see FIGS. 4 to 6B).

As shown in FIG. 3, the drive block A1 includes the electric motor 5 and a speed changer 12. The drive block A1 adjusts the rotative power of the electric motor 5 to output desired torque. That is, the electric tool 1 drives the tip tool 2 (bit) by the rotative power of the electric motor 5. In the following description, for example, the electric tool 1 is assumed to be used to tighten (or loosen) the work target 100, but the electric tool 1 may be used, for example, to drill a hole.

The electric motor 5 is a drive source configured to drive the tip tool 2. The electric motor 5 has a rotary shaft for outputting rotative power. The electric motor 5 is supplied with electric power from the power source 6 to give motive power to the output shaft 3. The electric motor 5 is, for example, a brushless motor. The drive block A1 transmits rotation of the electric motor 5 to the tip tool 2 to drive the tip tool 2.

In this embodiment, the tip tool 2 is a driver bit for tightening (or loosening) the work target 100 but is not particularly limited to this example. The tip tool 2 may be, for example, a drill bit. The work target 100 may be, for example, a screw, a bolt, a vice, or a nut. In FIG. 3, a wood screw is shown as the work target 100.

The speed changer 12 includes the output shaft 3, a plurality of gears, and a gear case 120 (see FIG. 4) housing the output shaft 3, the plurality of gears, and other components. The speed changer 12 includes a mechanism (deceleration mechanism) which can change its gear ratio in accordance with an operation given to the gear change button 18. The speed changer 12 is configured to reduce the rotative power to decelerate rotation of the electric motor 5.

The output shaft 3 holds the tip tool 2. The output shaft 3 is coupled to the rotary shaft of the electric motor 5 via the plurality of gears. The output shaft 3 is rotated by motive power (driving force) transmitted from the electric motor 5. The output shaft 3 holds the tip tool 2, and in this state, the output shaft 3, together with the tip tool 2, is rotated by the motive power provided from the electric motor 5. The output shaft 3 has a front surface having a bit attachment hole 30 which is recessed rearward. The chuck 7 is fixed to the output shaft 3. Of a plurality of types of tip tools 2, a tip tool 2 suitable for the intended use is fit in the bit attachment hole 30 and is fixed (attached) to the output shaft 3 by the chuck 7. The tip tool 2 may be directly attached to the output shaft 3.

The clutch mechanism E1 is provided in the gear case 120. The clutch handle 14 (dial ring) is located backward of the chuck 7 and is held to be rotatable relative to a body 91 of the housing 9. The clutch handle 14 is coupled to the gear case 120 via the support block 11. A user can rotate the clutch handle 14 by his/her fingers to adjust torque (strength of tightening the work target 100) to any one of a plurality of steps. Detailed description is omitted, but the clutch mechanism E1 includes, for example, a plurality of spheres, a plurality of compression springs for pressing the respective spheres, and a plurality of projections formed in front of the inner gear (ring gear) of the speed changer 12. The support block 11 retracts to increase pressing force with which the compression springs disposed in the gear case 120 press the spheres. When screw tightening torque greater than or equal to a set torque is applied, the plurality of projections in front of the inner gear are caught by the spheres, rotation of the inner gear is thus restricted, and accordingly, the rotation of the output shaft 3 is restricted. As described above, the clutch mechanism E1 is configured to mechanically interrupt a motive power path at a time point at which the screw tightening torque greater than or equal to the set torque is applied with respect to a rotation output of the speed changer 12. This reduces the possibility that the work target 100 is excessively tightened or the work target 100 and the like are crushed.

The power source 6 is a direct-current power supply which is to be used to drive the electric motor 5. The power source 6 includes one or more secondary batteries. The power source 6 is a so-called battery pack and is detachably attached to a rear end (rear end of a grip 92) of the housing 9. The power source 6 is used as an operation power supply for the controller 4, the inverter circuit unit 13, and the like.

The inverter circuit unit 13 is a circuit for driving the electric motor 5. The inverter circuit unit 13 is configured to convert a voltage from the power source 6 into a drive voltage for the electric motor 5. Specifically, the inverter circuit unit 13 includes a Pulse Width Modulation (PWM) inverter and a PWM converter. The PWM converter generates a PWM signal pulse-width-modulated in accordance with a target value of the drive voltage (the U-phase voltage, the V-phase voltage, and the W-phase voltage). The PWM inverter includes half-bridge circuits and drivers for the three phases. In the PWM inverter, the drivers turn on/off switching elements in respective half-bridge circuits in accordance with the PWM signal, thereby applying the drive voltage according to the target value to the electric motor 5. Thus, the electric motor 5 is supplied with a drive current according to the drive voltage. The controller 4 is used along with the inverter circuit unit 13 and performs feedback control to control the operation of the electric motor 5. Note that details of the controller 4 will be described later.

In this embodiment, the electric tool 1 includes a trigger controller TR1 as an operating unit for receiving an operation for controlling rotation of the electric motor 5. Note that the trigger controller TR1 of the present embodiment includes the output shaft 3, the sensing unit 8, and part of the support block 11 (a transfer part 111 and a support 112 which will be described later). The trigger controller TR1 is configured, when receiving pressing force form the tip end of the tip tool 2, to adjust, in accordance with the magnitude of the pressing force, the rotational speed of the output shaft 3, that is, the rotational speed of the electric motor 5. Thus, giving an operation to the trigger controller TR1 controls the rotational speed of the electric motor 5, thereby controlling the rotational speed of the tip tool 2.

The electric tool 1 further includes a motor rotation measuring unit 15 (see FIG. 3) configured to measure the angle of rotation of the electric motor 5. The motor rotation measuring unit 15 includes, for example, a photoelectric encoder or a magnetic encoder.

As shown in FIGS. 1 and 2, the housing 9 includes a tip end cover 90, the body 91, and the grip 92.

The tip end cover 90 is tubular and has a rear surface which is open. The tip end cover 90 is detachably attached to the body 91 to cover the entirety of the clutch handle 14. Moreover, the tip end cover 90 has a front surface having an insertion hole 93 communicated to an internal space, and in a state where the tip end cover 90 is attached to the body 91, a tip end of the output shaft 3 and the chuck 7 protrude to an outer side through the insertion hole 93. The tip end cover 90 is configured to hold the clutch handle 14 at a set location. In other words, the tip end cover 90 is attached to the body 91, and thereby, an inner side surface of the tip end cover 90 comes into contact with an outer side surface of the clutch handle 14, which reduces the possibility that the clutch handle 14 is unintentionally rotated during work.

The body 91 is elongated along the forward/backward direction to be in the form of a rod as a whole. The body 91 is hollow and has an accommodation space in the interior thereof to accommodate the drive block A1, the clutch mechanism E1, the sensing unit 8, the support block 11, and other components.

The body 91 has a first window hole 911 through which light emitted from the first light source 101 is output to the outside. The first window hole 911 is provided in a front end surface of the body 91 and has a round opening.

The body 91 has a second window hole 912 through which light emitted from the second light source 102 is output to the outside. The second window hole 912 is provided in a lower end surface of the body 91 and has a rectangular opening.

The first light source 101 includes, for example, a shell-type Light Emitting Diode (LED) as a light source and outputs light through the first window hole 911. The second light source 102 includes, for example, a chip-type LED as a light source. The second light source 102 further includes a light transmissive member 104 to be fit in the second window hole 912 and outputs light through the light transmissive member 104 to the outside.

The body 91 has a front end to which the clutch handle 14 is to be attached. Moreover, the body 91 is configured to hold the pair of switches 16, the lock button 17, the gear change button 18, and the light button 103 such that these components are in an exposed state.

The grip 92 is configured to be easily gripped by a hand of a user during work. The grip 92 is elongated to be in the form of a rod. As shown in FIG. 1, the grip 92 is held by the body 91 so as to be pivotable between a first position in which the grip 92 is extended linearly in the forward/backward direction and a second position in which the grip 92 is bent downward so that an angle of substantially 90 degrees is formed with respect to the forward/backward direction (see long dashed double-short dashed line in FIG. 1). In sum, the electric tool 1 has a straight-style exterior when the grip 92 takes the first position, and the electric tool 1 is deformable to have a pistol-style exterior by causing the grip 92 to pivot from the first position to the second position. When using the electric tool 1, a user may select the straight-style or the pistol-style depending on a work environment or his/her preference.

The grip 92 is hollow and has the accommodation space in the interior thereof to accommodate the controller 4, the inverter circuit unit 13, the motor rotation measuring unit 15, and other components. The grip 92 has a rear end having a power supply attachment port to which the power source 6 is to be detachably attached. The power source 6 is attached to the power supply attachment port, and thereby, the power source 6 is electrically connected to the controller 4 and the inverter circuit unit 13. Note that at a time point at which the power source 6 is attached, the controller 4 enters into a standby state.

The pair of switches 16 are provided to respective left and right side surfaces at a rear end of the body 91 in the vicinity of the grip 92. Each switch 16 is a switch for starting/stopping the rotation of the output shaft 3. As long as a center part 160 of each switch 16 is located at the center, the electric tool 1 keeps the rotation of the output shaft 3 in a stop state. When the center part 160 of any switch 16 is pressed forward or rearward, the electric tool 1 starts the rotation of the output shaft 3. In particular, each switch 16 is configured to receive a selection of forward rotation of the tip tool 2 or reverse rotation of the tip tool 2 depending on whether each switch 16 is pressed frontward or rearward.

For example, when the switch 16 on the right side surface is pressed frontward, the electric tool 1 executes the forward rotation, and when the switch 16 on the right side surface is pressed rearward, the electric tool 1 executes the reverse rotation. In contrast, when the switch 16 on the left side surface is pressed frontward, the electric tool 1 executes the reverse rotation, and when the switch 16 on the left side surface is pressed rearward, the electric tool 1 executes the forward rotation. Depending on whether a user uses the electric tool 1 in the pistol-style or the straight-style, the user may differently hold the grip 92 to operate the switch 16 on the right side surface or the switch 16 on the left side surface by his/her first finger.

Note that as described above, the electric tool 1 of the present embodiment includes the trigger controller TR1 configured to receive an operation for controlling the rotational speed of the tip tool 2. Therefore, the switches 16 may be omitted. That is, the switches 16 are not essential components for the electric tool 1. Alternatively, in addition to rotational speed control by the trigger controller TR1, the rotational speed may also be controlled based on the manipulative variable indicating how deep each switch 16 has been pressed.

The lock button 17 is a button for mechanically restricting (locking) displacement of the pair of switches 16. When the lock button 17 is in a rearwardly pressed state (in the state shown in FIG. 1), the pair of switches 16 are in a locked state, which reduces the possibility that any switch 16 is pressed and the rotation of the output shaft 3 is thus started without an intention of a user. When the lock button 17 is pressed frontward, the locked state is released. Note that the switches 16 may be omitted, and therefore, when the switches 16 are omitted, the lock button 17 may also be omitted.

The gear change button 18 is a button for changing the gear ratio of the speed changer 12 to switch the rotational speed of the output shaft 3 to a high speed or a low speed. When the gear change button 18 is in a rearwardly pressed state (in the state shown in FIG. 1), the speed changer 12 is in the low-speed state, and when the gear change button 18 is pressed frontward, the speed changer 12 is switched to a high-speed state.

The light button 103 is a button for turning on the first light source 101 and the second light source 102. The electric tool 1 further includes a lighting circuit (the detailed description of which is omitted) for turning on these light sources in accordance with an operation given to the light button 103. For example, each time a press operation is given to the light button 103, turning on only the first light source 101, turning on only the second light source 102, turning on both the light sources, and turning off both the light sources are sequentially switched. A user turns on one of the first light source 101 or the second light source 102, or both of the first light source 101 and the second light source 102, thereby suppressing the workability from being reduced even in a dark work environment.

Figure 4:
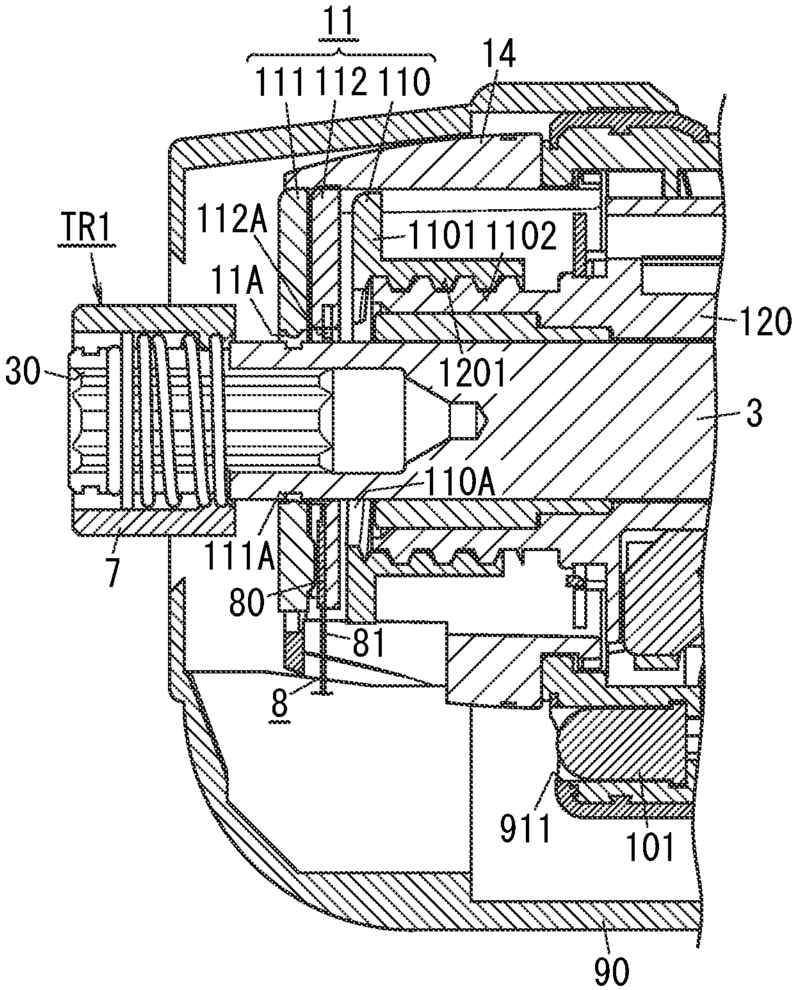
FIG. 4 is a sectional view of a main part of an output shaft and a portion around the output shaft of the electric tool.
Figure 5:
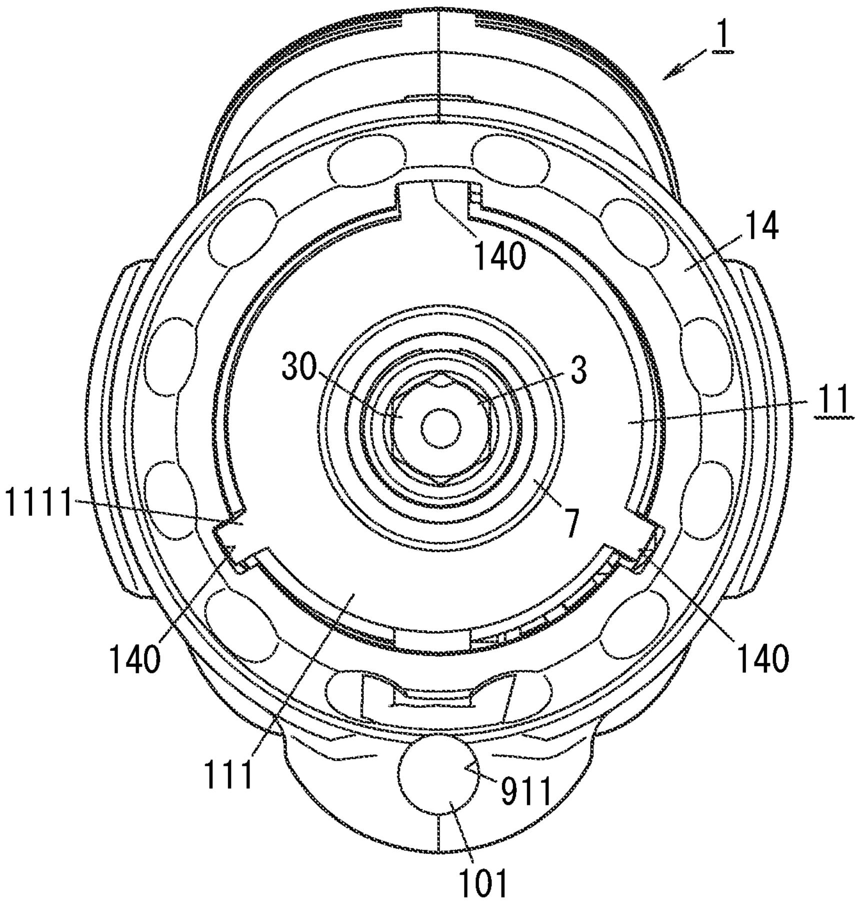
FIG. 5 is a front view of the electric tool with a tip end cover being removed.
Figure 7A:
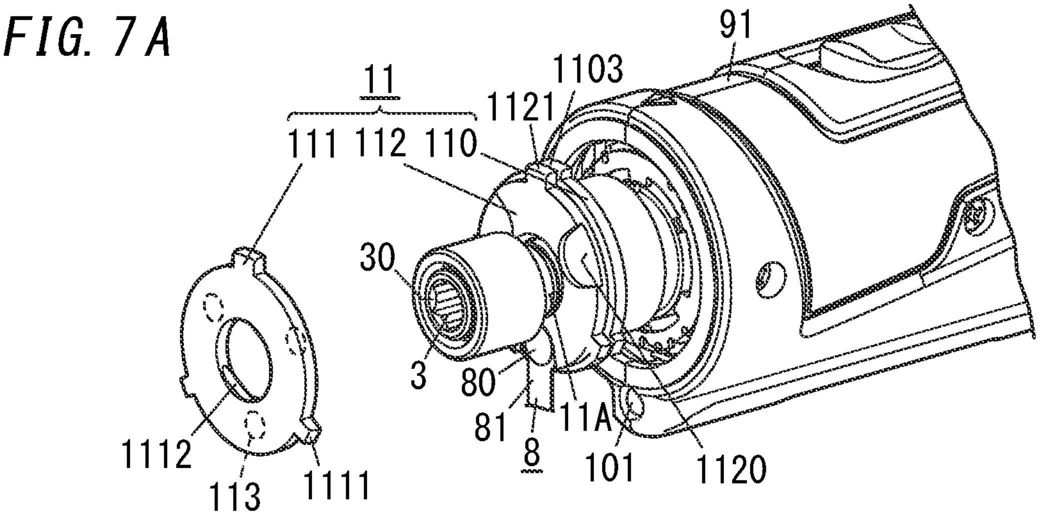
FIG. 7A is an exploded perspective view of the main part of the electric tool.

As shown in FIGS. 4 and 7A, the sensing unit 8 includes one or a plurality of pressure-sensitive sensors (in the example shown in the figure, one pressure-sensitive sensor) 80 configured to sense pressing force. The pressure-sensitive sensor 80 is in sheet form. The pressure-sensitive sensor 80 includes, for example, a piezoelectric element. When force (pressing force) is applied to the pressure-sensitive sensor 80, the resistance value of the pressure-sensitive sensor 80 changes in accordance with the pressing force, and the resistance value is converted into a voltage. In other words, the electric tool 1 further includes the pressure-sensitive sensor 80 configured to sense the pressing force. The pressure-sensitive sensor 80 is not limited to the piezoelectric element but may include, for example, a strain gauge for measuring a change in electric resistance resulting from deformation of the resistive element in accordance with the pressing force.

The sensing unit 8 is electrically connected to the controller 4. The controller 4 acquires from the sensing unit 8 an output value corresponding to a sensing result of the pressing force. The controller 4 then adjusts the rotational speed of the output shaft 3 in accordance with the magnitude (output value) of an output from the pressure-sensitive sensor 80.

The arrangement of the pressure-sensitive sensor 80 relative to the axial direction of the output shaft 3 is not particularly limited, but when viewed in the radial direction of the output shaft 3 as shown in FIG. 3, the pressure-sensitive sensor 80 is preferably arranged between a tip end of the electric tool 1 (in this embodiment, the tip end of the output shaft 3) and the electric motor 5. In this case, the possibility that the size of the electric tool 1 may be increased is reduced. Note that the pressure-sensitive sensor 80 is more preferably arranged between the tip end of the electric tool 1 and the drive block A1.

The support block 11 is a part for supporting the sensing unit 8. When the clutch handle 14 is rotated by a finger of a user, the support block 11 rotates rearward along with the rotation of the clutch handle 14 and transmits adjustment force to the clutch mechanism E1 to perform a setting relating to torque (strength of tightening the work target 100). The support block 11 will be described in detail later.

(2.2) Support Block

The support block 11 is configured to support the sensing unit 8. The support block 11 is disposed backward of the chuck 7 so as to be covered with the clutch handle 14. The support block 11 is attached to the gear case 120 and is positioned by the clutch handle 14.

Figure 6A:
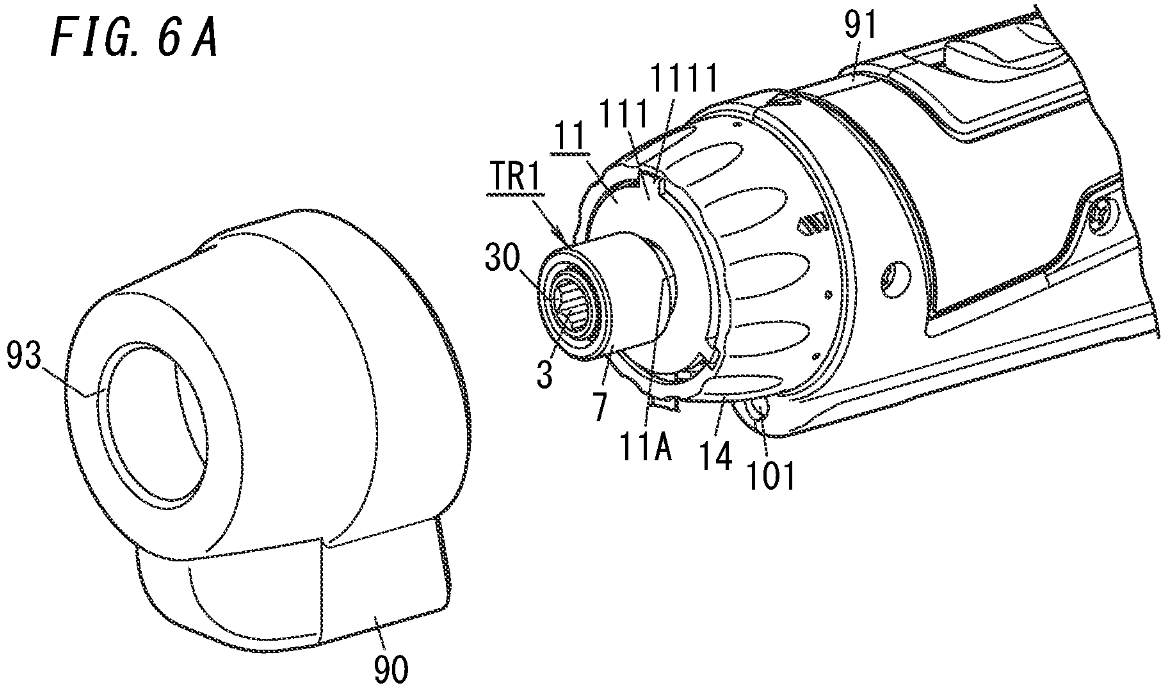
FIG. 6A is an exploded perspective view of the main part of the electric tool.
Figure 6B:
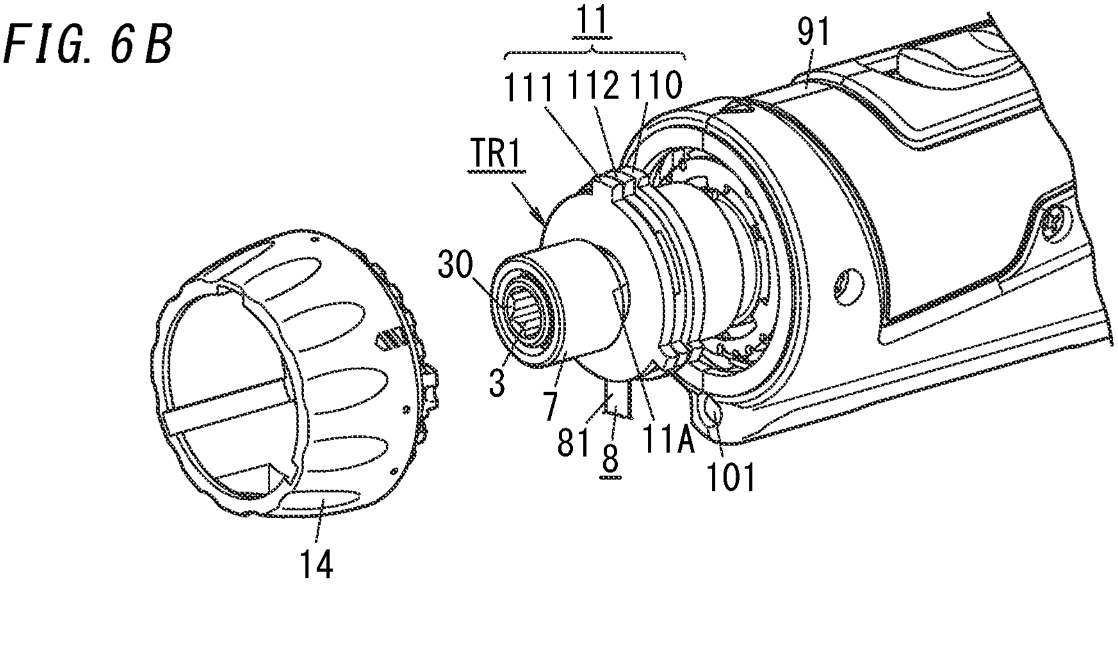
FIG. 6B is an exploded perspective view of the main part of the electric tool.

The support block 11 as a whole has a substantially cylindrical shape having a through hole 11A penetrating the support block 11 in the axial direction (corresponding to the forward/backward direction) thereof. The output shaft 3 extends through the through hole 11A and protrudes forward beyond the support block 11. As shown in FIGS. 4, 6B, and 7A, the support block 11 includes a body 110, the transfer part 111, and the support 112. The transfer part 111, the support 112, and the body 110 are coaxially arranged in this order from the side of the chuck 7 to the back.

As shown in FIG. 4, the body 110 is a part having a substantially cylindrical shape and having a through hole 110A penetrating the body 110 in the axial direction (corresponding to the forward/backward direction) thereof. The through hole 110A is part of the through hole 11A formed in the support block 11. The body 110 has a front end provided with a flange 1101. The body 110 further has an inner peripheral surface having screw-projections 1102 and is screwed onto thread grooves 1201 formed in an outer peripheral surface of the gear case 120, and thereby, the body 110 is attached to the gear case 120. The body 110 holds the transfer part 111 and the support 112 at prescribed locations.

Moreover, the body 110 is configured such that when the clutch handle 14 is rotated by a finger of a user, the entirety of the support block 11 rotates along with the rotation of the clutch handle 14 and transmits its adjustment force to the clutch mechanism E1. The body 110 has three projections 1103 (see FIG. 7A) protruding outward from the outer periphery thereof. The three projections 1103 are aligned along the circumferential direction at substantially equal intervals when viewed along the axial direction of the body 110. The three projections 1103 are fit in respective three groove parts 140 (see FIG. 5) outwardly recessed in an inner peripheral surface of the clutch handle 14. Each groove part 140 extends from the front end to the rear end of the clutch handle 14. Thus, when the clutch handle 14 is rotated, the body 110, together with the clutch handle 14, rotates relative to the output shaft 3 extending through the through hole 110A.

Figure 7B:
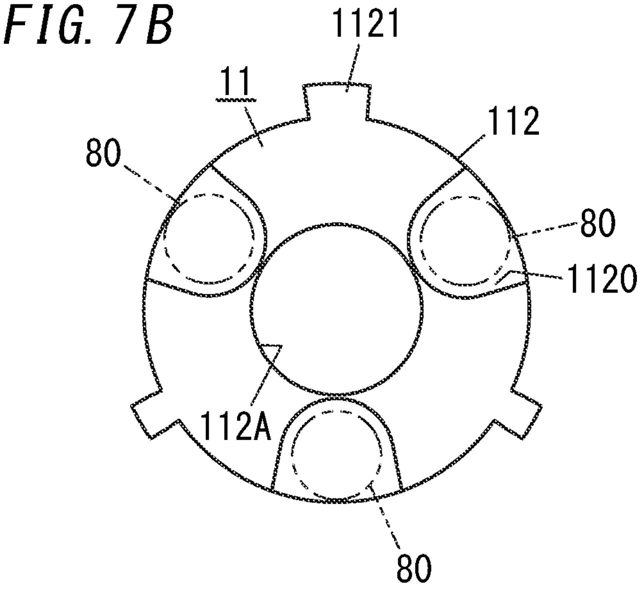
FIG. 7B is a front view of a support of the electric tool.

The support 112 is in the form of a flat ring-shaped plate. As shown in FIGS. 4 and 7B, the support 112 has a through hole 112A penetrating the support 112 in the axial direction (corresponding to the forward/backward direction) thereof. The through hole 112A is part of the through hole 11A formed in the support block 11. As shown in FIG. 7A, the support 112 has three positioning grooves 1120 recessed rearward in the front surface thereof. Each positioning groove 1120 has a substantially semicircular shape expanding toward the center of the axis when the support 112 is viewed from the front side. The three positioning grooves 1120 are aligned in the circumferential direction at substantially equal intervals. Each positioning groove 1120 is a part in which the pressure-sensitive sensor 80 of the sensing unit 8 is to be fit for positioning. The sensing unit 8 has a lead part 81 led out toward the interior of the body 91 of the housing 9 and electrically connected via an electric wire to the controller 4. Note that in the example shown in the figure, the illustration of the lead part 81 is omitted from its middle part.

In the present embodiment, the number of pressure-sensitive sensors 80 is, for example, one, and therefore, the one pressure-sensitive sensor 80 is disposed in one (positioning groove 1120 on a lower side) of the three positioning grooves 1120. The pressure-sensitive sensor 80 may be fixed to the positioning groove 1120 with an adhesive agent or the like.

If the number of pressure-sensitive sensors 80 is two or three, the pressure-sensitive sensors 80 may be disposed in the remaining positioning grooves 1120. In other words, the number of pressure-sensitive sensors 80 is not particularly limited, and the electric tool 1 may include a plurality of pressure-sensitive sensors 80 (see FIG. 7B). According to the number of pressure-sensitive sensors 80, the number of positioning grooves 1120 may be one or two, or four or more. When the electric tool 1 includes a plurality of pressure-sensitive sensors 80, as shown in FIG. 7B, the plurality of pressure-sensitive sensors 80 may be aligned in the circumferential direction of the output shaft 3. In particular, the plurality of pressure-sensitive sensors 80 may be aligned in the circumferential direction at substantially equal intervals.

Alternatively, the sensing unit 8 may be configured as one ring-like sheet unit. The plurality of pressure-sensitive sensors 80 may be arranged on the sheet unit to surround the output shaft 3. In this case, the positioning groove 1120 may be formed as one ring-like groove such that the ring-like sheet unit is positioned, or the positioning groove 1120 itself may be omitted.

The support 112 has three projections 1121 protruding outward from the outer edge thereof in a similar manner to the three projections 1103 of the body 110. The three projections 1121 are aligned along the circumferential direction at substantially equal intervals when viewed along the axial direction of the support 112. The three projections 1121 are fit in the respective three groove parts 140 of the clutch handle 14. Thus, when the clutch handle 14 is rotated by a finger of a user, the support 112, together with the clutch handle 14, rotates relative to the output shaft 3 extending through the through hole 112A.

The transfer part 111 is in the form of a flat ring-shaped plate. The transfer part 111 has, for example, substantially the same shape and substantially the same dimension as the support 112. As shown in FIG. 4, the transfer part 111 has a through hole 111A penetrating the transfer part 111 in the axial direction (corresponding to the forward/backward direction) thereof. The through hole 111A is part of the through hole 11A of the support block 11. The transfer part 111 has three projections 1111 protruding outward from the outer edge thereof. The three projections 1111 are aligned along the circumferential direction at substantially equal intervals when viewed along the axial direction of the transfer part 111. The three projections 1111 are fit in the respective three groove parts 140 of the clutch handle 14.

In this embodiment, the transfer part 111 is disposed to face the front surface of the support 112. In other words, the transfer part 111 is disposed to face the pressure-sensitive sensor 80 and is configured to transfer pressing force to the pressure-sensitive sensor 80 by coming into contact with the pressure-sensitive sensor 80. The output shaft 3 rotates relative to the support 112 and the transfer part 111. As shown in FIG. 7A, the transfer part 111 has a rear surface having three contacts 113 protruding in circular shape. The three contacts 113 are disposed to face the respective three positioning grooves 1120 formed in the support 112.

Note that the transfer part 111 has a pair of positioning parts 1112 (see FIG. 7A: in the example shown in the figure, only one of the positioning parts is shown) protruding inward at a peripheral surface of the through hole 111A. The pair of positioning parts 1112 are arranged to face each other when the transfer part 111 is viewed from the front side. The pair of positioning parts 1112 are in contact with a side surface of the output shaft 3 such that the output shaft 3 is sandwiched between the pair of positioning parts 1112. Thus, the transfer part 111 is stably positioned. In particular, the pair of positioning parts 1112 abut a stepped part provided to the side surface of the output shaft 3, which suppresses the transfer part 111 from retracting when the clutch handle 14 is rotated by a finger of a user. In other words, while the entirety of the support block 11 rotates along with the clutch handle 14, the body 110 and the support 112 of the support block 11 retract relative to the gear case 120 while rotating like feed screws, and thereby, the body 110 and the support 112 transmit the adjustment force to the clutch mechanism E1. In contrast, the transfer part 111 does not retract and remains.

When the tip tool 2 receives the pressing force in the pressing direction D1, the output shaft 3 and the chuck 7 retract together with the tip tool 2. At this time, a rear end of the chuck 7 comes into contact with and presses the transfer part 111, and thereby, the transfer part 111 receives the pressing force from the tip end of the tip tool 2. As a result, the contact 113 of the transfer part 111 comes into contact with and presses a surface of the pressure-sensitive sensor 80 disposed in the positioning groove 1120 facing the contact 113.

Even when the trigger controller TR1 receives an operation during the process of pressing and the output shaft 3 and the chuck 7 start rotating, the three projections 1111 are fit in the respective three groove parts 140, and the transfer part 111 does thus not rotate. Similarly, the support 112 and the body 110 do not rotate even when the output shaft 3 and the chuck 7 start rotating. In sum, the pressure-sensitive sensor 80 is disposed between two members (the support 112 and the transfer part 111) which do not rotate along with the rotation of the output shaft 3 even when the output shaft 3 starts rotating. This can reduce the possibility that the surface of the pressure-sensitive sensor 80 is scraped and scratched as the output shaft 3 rotates. As a result, the reliability relating to rotation control can be suppressed from decreasing.

Note that the contact 113 facing the pressure-sensitive sensor 80 may be slightly in contact with, or may be separated from, the pressure-sensitive sensor 80 in a state where the contact 113 receives no pressing force.

As described above, the pressure-sensitive sensor 80 of the present embodiment is supported by the support 112 such that the pressure-sensitive sensor 80 receives the pressing force in a direction (pressing direction D1) from the tip end of the tip tool 2 toward the output shaft 3. Note that in the present disclosure, as an example of a structure that "receives pressing force in the pressing direction D1", the pressure-sensitive sensor 80 is supported such that a surface of the pressure-sensitive sensor 80 is substantially orthogonal to the axial direction (Y-axial direction) of the output shaft 3. However, it is not essential that the surface of the pressure-sensitive sensor 80 is substantially orthogonal to the axial direction of the output shaft 3. The pressure-sensitive sensor 80 may be tilted, if the pressure-sensitive sensor 80 is supported such that regarding the pressing force first component force in a direction orthogonal to the surface of the pressure-sensitive sensor 80 is dominant over second component force in a parallel direction to the surface. Specifically, the pressure-sensitive sensor 80 may be supported such that the surface of the pressure-sensitive sensor 80 is tilted to form an angle of 45 degrees or smaller with respect to the X-Z plane.

(2.3) Controller

The controller 4 includes a computer system including one or more processors and a memory. At least some of the functions of the controller 4 are implemented by making the processor of the computer system execute a program stored in the memory of the computer system. The program may be stored in the memory. The program may also be downloaded via a telecommunications network such as the Internet or may be distributed after having been stored in a non-transitory storage medium such as a memory card.

The controller 4 performs, for example, time differentiation based on the angle of rotation of the electric motor 5 measured by the motor rotation measuring unit 15 to calculate the angular velocity of the electric motor 5 (angular velocity of the rotary shaft). The controller 4 performs PWM control of the inverter circuit unit 13 to control electric power to be supplied to the electric motor 5. In particular, the controller 4 determines the target value of the drive voltage in accordance with the sensing result by the sensing unit 8 and controls the inverter circuit unit 13 to adjust the angular velocity of the electric motor 5. The inverter circuit unit 13 is controlled by the controller 4 to increase or reduce a drive current flowing through a coil of the electric motor 5, thereby adjusting the magnetic flux of a permanent magnet of the electric motor 5 to control the rotational frequency of the electric motor 5 (rotational frequency of the rotary shaft).

The controller 4 of the present embodiment is configured to control the rotation of the output shaft 3 in accordance with pressing force in the pressing direction D1 from the tip end of the tip tool 2 toward the output shaft 3. Here, the electric tool 1 has, as part of an operation range, a restriction range R0 (see FIG. 8) in which the rotation of the output shaft 3 is restricted in a state where the pressing force is less than or equal to a prescribed value. Note that in FIG. 8, the abscissa represents pressing force [N] (newton).

That is, for example, a user brings the tip end of the tip tool 2 attached to the output shaft 3 via the chuck 7 into contact with the work target 100 and further applies force pressing the work target 100 by the tip end of the tip tool 2. In this case, the tip end of the tip tool 2 receives counter force as stress from the work target 100, and the counter force is generated as the "pressing force" in the pressing direction D1. In sum, a user gives a push operation to the trigger controller TR1, and thereby, the electric tool 1 starts the rotation of the output shaft 3. However, in the present embodiment, the restriction range R0 is provided, and therefore, even when the trigger controller TR1 is pressed, the rotation of the output shaft 3 is not started unless the pressing force exceeds a prescribed value. The restriction range R0 will be described in more detail below.

(2.4) Restriction Range

As described above, the controller 4 acquires from the sensing unit 8 an output value corresponding to a sensing result of the pressing force. The output value is, for example, a voltage (value) which changes in accordance with the pressing force applied to the pressure-sensitive sensor 80. The controller 4 receives a sensing signal including the output value (voltage value) from the sensing unit 8. The "prescribed value" corresponds to the output value (voltage value).

When the controller 4 determines that the output value is less than or equal to a threshold, the controller 4 restricts the rotation of the output shaft 3. In particular, when the controller 4 determines that the output value is less than or equal to the threshold, the controller 4 mechanistically interrupts transmission of motive power from the electric motor 5 to the output shaft 3, thereby restricting the rotation of the output shaft 3. As used herein, "mechanistically interrupt" may be interruption by an electrical mechanism, interruption by a mechanical mechanism, or interruption by both the electrical mechanism and the mechanical mechanism. In this embodiment, for example, the electric tool 1 has a configuration that interrupts transmission of the motive power by both the electrical mechanism and the mechanical mechanism.

Specifically, the electric tool 1 further includes an interruption mechanism B1 and a lock mechanism C1 as shown in FIG. 3.

The interruption mechanism B1 is configured to restrict, in the restriction range R0, the rotation of the output shaft 3 by an electrical cut-off. For example, the interruption mechanism B1 includes a contact part P1 (see FIG. 3) to be inserted into an electric path between the electric motor 5 and the power source 6. The contact part P1 switches the electric path from an energized state to a non-energized state and vice versa, depending on the closed state or opened state of the contact thereof. The contact part P1 includes, for example, a semiconductor switch. The contact part P1 is, for example, in normally opened state, and when the controller 4 determines that the output value is less than or equal to the threshold (hereinafter referred to as a "first threshold" in some cases), the contact part P1 maintains the opened state. That is, the non-energized state is maintained, and the rotation of the electric motor 5 is restricted, so that the rotation of the output shaft 3 is restricted.

In this embodiment, for example, the contact part P1 is disposed in the inverter circuit unit 13 which is supplied with electric power from the power source 6 to generate a drive voltage for the electric motor 5. When the contact part P1 is in the opened state, the drive voltage is not given to the electric motor 5, and when the contact part P1 is switched to the closed state, the drive voltage is given to the electric motor 5. The contact part P1 is not limited to being disposed in the inverter circuit unit 13. However, the contact part P1 is preferably disposed in any of electric paths from the power source 6 to the electric motor 5 as shown in FIG. 3.

When the controller 4 determines that the output value exceeds the first threshold, the controller 4 controls the contact part P1 such that the non-energized state is switched to the energized state. That is, rotation restriction of the electric motor 5 by the interruption mechanism B1 is removed, and consequently, rotation restriction of the output shaft 3 is also removed.

The lock mechanism C1 is configured to restrict, in the restriction range R0, the rotation of the output shaft 3 by a mechanical lock. As shown in FIG. 3, the lock mechanism C1 may correspond to, for example, the clutch mechanism E1. That is, in a state where the output shaft 3 does not start rotating, the plurality of spheres of the clutch mechanism E1 are kept caught by the plurality of projections in front of the inner gear, and therefore, the rotation of the output shaft 3 is mechanically locked. In other words, in the restriction range R0 in which the output value is less than or equal to the first threshold, the rotation of the output shaft 3 is mechanically locked.

The lock mechanism C1 may, however, be provided separately from the clutch mechanism E1. For example, the lock mechanism C1 may include a driver to be controlled by the controller 4 such that the driver is driven to increase force with which the compression spring of the clutch mechanism E1 presses the spheres. When the controller 4 determines that the output value is less than or equal to a threshold (which may be the same as or different from the first threshold), the controller 4 may cause a drive current to flow to drive the driver and press the compression spring of the clutch mechanism E1 to increase the pushing force applied to the spheres such that the inner gear of the speed changer 12 is not rotated. When the controller 4 determines that the output value exceeds the threshold, the driving of the driver may be canceled.

Figure 8:
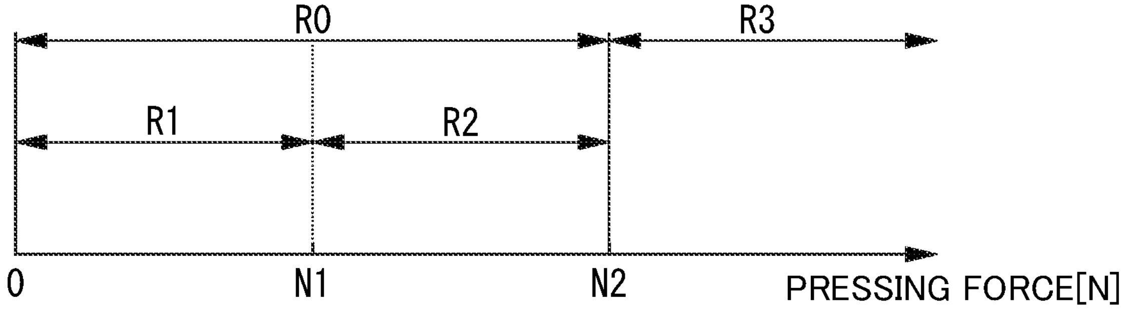
FIG. 8 is a view illustrating restriction ranges of the electric tool.

Incidentally, the restriction range R0 of the present embodiment may include at least a first range R1 and a second range R2 as shown in FIG. 8. The first range R1 is a range in which the rotation of the output shaft 3 is restricted by at least one of the "mechanical lock" or the "electrical cut-off" and the output shaft 3 is thus in the non-rotatable state. The second range R2 is a range in which the non-rotatable state is released but the motive power of the electric motor 5 is maintained at zero.

In the example shown in FIG. 8, pressing force N1 is, for example, 5[N], and pressing force N2 is, for example, 10[N]. The "prescribed value" corresponds to the pressing force N2. For example, the voltage values of a voltage received from the sensing unit 8 when the pressing force is zero, when the pressing force is the pressing force N1, and when the pressing force is the pressing force N2 are respectively about 1.5[V], 2[V], and 2.5[V]. These numerical values are mere examples and should not be construed as limiting. In this embodiment, the pressing force N1 is assumed to correspond to the first threshold, and the pressing force N2 is assumed to correspond to the second threshold higher than the first threshold.

Note that the electric tool 1 further has, as an operation range, a derestriction range R3 in which the rotation restriction of the output shaft 3 is removed. When the pressing force exceeds the pressing force N2, the operation range is switched from the restriction range R0 to the derestriction range R3.

In the present embodiment, the controller 4 maintains a state where the contact part P1 is opened in the first range R1. In other words, in the first range R1, the contact part P1 between the electric motor 5 and the power source 6 is opened, thereby the "electrical cut-off" is achieved.

When the pressing force exceeds the pressing force N1, that is, when the output value exceeds the first threshold, the controller 4 closes the contact part P1 to switch the operation range from the first range R1 to the second range R2. In the case of the lock mechanism C1 including the driver described above, the controller 4 cancels the driving of the driver when the pressing force exceeds the pressing force N1. As a result, in the second range R2, the non-rotatable state is released.

The controller 4, however, controls the inverter circuit unit 13 such that in the second range R2, even when the pressing force exceeds the pressing force N1, the driving voltage is not given to the electric motor 5 until the pressing force exceeds the pressing force N2, that is, until the output voltage exceeds the second threshold. In other words, also in the second range R2, transmission of the motive power from the electric motor 5 to the output shaft 3 is kept interrupted. The second range R2 is a range in which the inverter circuit unit 13 is in a standby state. The second range R2 is provided, and therefore, when the pressing force exceeds the pressing force N2, the inverter circuit unit 13 can immediately start rotary drive of the electric motor 5. Moreover, in the first range R1, an electric path to the electric motor 5 is interrupted, and therefore, as compared to the case where the electric path to the electric motor 5 is not interrupted, exhaustion of the power source 6 due to its self-discharge can be suppressed.

The controller 4 stores, in its memory (or an external storage of the controller 4), relationship information on association of a plurality of output values (voltage values) with a plurality of rotational frequencies. The present embodiment includes relationship information on a plurality of voltage values corresponding to the pressing force in a range from 0 [N] to 50 [N]. In other words, a control object of the controller 4 is, for example, a range in which the pressing force is 0 [N] to 50 [N] but is not particularly limited.

When the controller 4 determines that the output value exceeds the second threshold, the controller 4 thereafter controls the inverter circuit unit 13 such that the rotational frequency of the rotary shaft of the electric motor 5 is set to a rotational frequency corresponding to the output value. As a result, for example, the inverter circuit unit 13 is controlled such that the rotational speed of the output shaft 3 increases as the output value increases.

As described above, the electric tool 1 of the present embodiment has the restriction range R0, and therefore, even when force that presses the tip tool 2 is generated, the possibility that rotation of the tip tool 2 is immediately started is reduced. Thus, convenience can be improved. Note that the prescribed value (in the example shown in FIG. 8, the pressing force N2) is preferably set to a value greater than the value of the weight (self-weight) of the electric tool 1. In this case, the possibility that the rotation of the output shaft 3 is started without an intention of a user is reduced.

Moreover, the electric tool 1 has the restriction range R0, and therefore, a user can manually tighten or manually loosen the work target 100 in the restriction range R0. In other words, the electric tool 1 has a manual mode (manual tightening mode) in which a user holding the electric tool 1 works by turning his/her wrist to rotate the electric tool 1. A user gives a push operation to the trigger controller TR1, in particular, presses the trigger controller TR1 to such an extent that the pressing force exceeds the prescribed value, and thereby, the user can easily switch the manual mode to an electrically driven (rotational speed control) mode.

In addition, not only the restriction range R0 is simply provided, but also the first range R1 and the second range R2 are also provided to the restriction range R0, and therefore, the possibility that the rotation of the output shaft 3 is started without an intention of a user is further reduced. Moreover, for example, the first range R1 can be used as a range in which manual tightening is possible, and the second range R2 can be used as a stand-by range. A user is aware of the provision of the second range R2, which further improves the workability. In particular, the provision of the second range R2 can reduce the possibility that while a user is performing manual tightening in the first range R1, the pressing force is unintentionally applied and the rotation of the output shaft 3 is started.

Note that the electric tool 1 may further include a notification means configured to notify a user of that the operation range has been switched from the first range R1 to the second range R2 or that the operation range has been switched from the restriction range R0 to the derestriction range R3. The notification means may be a mechanism (e.g., a spring member) provided to the trigger controller TR1 and configured to provide, for example, a click feeling at the time of switching of the operation range. Alternatively, the notification means may be an indicator provided to the housing 9 and include an indicator configured such that a light emitting state of the indicator changes in response to the switching of the operation range (a change in light color, or a change from continuous lighting to flashing lighting).

In addition, in the present embodiment, the pressure-sensitive sensor 80 senses the pressing force, therefore, the convenience can be improved while the electric tool 1 is suppressed from increasing in size. The controller 4 makes a determination by comparing the output value and the threshold with each other and restricts the rotation of the output shaft 3, and therefore, highly reliable restriction of the rotation of the output shaft 3 is possible. Moreover, since the pressure-sensitive sensor 80 senses the pressing force, the amount of stroke at the time of a push operation can be reduced.

Incidentally, the electric tool 1 of the present embodiment further includes, as shown in FIG. 3, an operating unit 10 (not shown in FIGS. 1 and 2). The operating unit 10 is configured to receive an operation input to switch the operation range to the restriction range R0 or to the derestriction range R3. The operating unit 10 may include, for example, a push button switch. The controller 4 switches, independently of the determination of the threshold relating to the output value sensed by the sensing unit 8 but dependently on the state of the operation given to the operating unit 10 (an ON state or an OFF state), the operation range to the restriction range R0 or to the derestriction range R3. Thus, convenience is further improved. When the operation range is switched to the restriction range R0 by an operation given to the operating unit 10, the lock mechanism C1 preferably restricts the rotation of the output shaft 3 even if a push operation is given to the trigger controller TR1.

(3) Variation

The embodiment described above is merely an example of various embodiments of the present disclosure. Rather, the embodiment described above may be readily modified in various manners depending on a design choice or any other factor without departing from the scope of the present disclosure. Moreover, functions similar to those of the controller 4 of the electric tool 1 according to the embodiment described above may be implemented by a control method, a computer program, a non-transitory storage medium storing a computer program, or the like.

Next, variations of the embodiment described above will be enumerated one after another. The variations described below are applicable accordingly in combination. In the following description, the embodiment described above will be hereinafter sometimes referred to as a "basic example".

The controller 4 of the electric tool 1 of the present disclosure includes a computer system. The computer system includes a processor and a memory as principal hardware components. The processor executes a program stored in the memory of the computer system, thereby implementing functions as the controller 4 in the present disclosure. The program may be stored in the memory of the computer system in advance, may be provided via a telecommunications network, or may be provided as a non-transitory recording medium such as a computer system-readable memory card, optical disc, or hard disk drive storing the program. The processor of the computer system may be made up of a single or a plurality of electronic circuits including a semiconductor integrated circuit (IC) or a large-scale integrated circuit (LSI). The integrated circuit such as IC or LSI mentioned herein may be referred to in another way, depending on the degree of the integration and includes integrated circuits called system LSI, very-large-scale integration (VLSI), or ultra-large-scale integration (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. The plurality of electronic circuits may be collected on one chip or may be distributed on a plurality of chips. The plurality of chips may be collected in one device or may be distributed in a plurality of devices. As mentioned herein, the computer system includes a microcontroller including one or more processors and one or more memories. Thus, the microcontroller is also composed of one or more electronic circuits including a semiconductor integrated circuit or a large-scale integrated circuit.

Collecting the plurality of functions in the controller 4 in one housing is not an essential configuration. The components of the controller 4 may be distributed in a plurality of housings. In contrast, the plurality of functions in the controller 4 may be collected in one housing as in the case of the basic example. Still alternatively, at least some functions of the controller 4 (e.g., some functions of the controller 4) may be implemented as a cloud computing system as well.

In the basic example, the restriction range R0 includes two ranges, namely, the first range R1 and the second range R2. However, the restriction range R0 may have three or more ranges, and rotation restriction may be controlled with more finely divided stages. Moreover, the second range R2 of the basic example may be omitted, and in this case, the pressing force N2 may correspond to the first threshold.

In the basic example, the support block 11 has both a function of supporting the sensing unit 8 and a function of transmitting the adjustment force to the clutch mechanism E1. However, the support block 11 may be provided separately from a member that transfers the adjustment force to the clutch mechanism E1.

In the basic example, the number of pressure-sensitive sensors 80 is one as shown in FIG. 7A, and it has been described that a plurality of pressure-sensitive sensors 80 may be provided as shown in FIG. 7B. Here, in the configuration in which the electric tool 1 includes a plurality of pressure-sensitive sensors 80, the controller 4 may cause the output shaft 3 to start rotating when the value of at least one output of outputs from the plurality of pressure-sensitive sensors 80 exceeds the threshold. In this case, the output shaft 3 can be caused to start rotating, for example, even in a narrow work environment in which the electric tool 1 has to be used with the output shaft 3 being oblique relative to a work surface.

Alternatively, in the configuration in which the electric tool 1 includes a plurality of pressure-sensitive sensors 80, the controller 4 may cause the output shaft 3 to start rotating when the values of all of outputs from the plurality of pressure-sensitive sensors 80 exceed the threshold. In this case, for example, the possibility that the output shaft 3 starts rotating without an intention of a user is reduced.

(4) Summary

As described above, an electric tool (1) of a first aspect includes an output shaft (3) and a controller (4). The output shaft (3) is configured to hold a tip tool (2) and be rotated by motive power provided from an electric motor (5) with the output shaft (3) holding the tip tool (2). The controller (4) is configured to control rotation of the output shaft (3) in accordance with pressing force in a direction from a tip end of the tip tool (2) toward the output shaft (3). The electric tool (1) has, as an operation range, a restriction range (R0) in which the rotation of the output shaft (3) is restricted in a state where the pressing force is less than or equal to a prescribed value. With the first aspect, convenience is improved.

In an electric tool (1) of a second aspect referring to the first aspect, the prescribed value is greater than a value of a self-weight of the electric tool (1). With the second aspect, the possibility that the rotation of the output shaft (3) is started without an intention of a user is reduced.

An electric tool (1) of a third aspect referring to the first or second aspect further includes a pressure-sensitive sensor (80) configured to sense the pressing force. With the third aspect, convenience is improved while the size of the electric tool (1) is suppressed from increasing.

In an electric tool (1) of a fourth aspect referring to the third aspect, the controller (4) is configured to acquire an output value as a sensing result of the pressing force from the pressure-sensitive sensor (80). The controller (4) is configured, when determining that the output value is less than or equal to a threshold, to restrict the rotation of the output shaft (3). With the fourth aspect, the rotation of the output shaft (3) is restricted with increased reliability.

In an electric tool (1) of a fifth aspect referring to the fourth aspect, the controller (4) is configured, when determining that the output value is less than or equal to the threshold, to mechanistically interrupt transmission of the motive power from the electric motor (5) to the output shaft (3) to restrict the rotation of the output shaft (3). With the fifth aspect, the rotation of the output shaft (3) is restricted with further increased reliability.

In an electric tool (1) of a sixth aspect referring to any one of the first to fifth aspects, the restriction range (R0) includes at least a first range (R1) and a second range (R2). The first range (R1) is a range in which the rotation of the output shaft (3) is restricted by at least one of a mechanical lock or an electrical cut-off and the output shaft (3) is in a non-rotatable state. The second range (R2) is a range in which the non-rotatable state is released and the motive power of the electric motor (5) is maintained at zero. With the sixth aspect, the first range (R1) and the second range (R2) are provided, which reduces the possibility that the rotation of the output shaft (3) is started without an intention of a user. Moreover, for example, the first range (R1) is usable as a range in which manual tightening may be performed.

In an electric tool (1) of a seventh aspect referring to the sixth aspect, the electric motor (5) is configured be supplied with electric power from a power source (6) and give the motive power to the output shaft (3). In the first range (R1), a contact part (P1) between the electric motor (5) and the power source (6) is opened to achieve the electrical cut-off. With the seventh aspect, the possibility that the rotation of the output shaft (3) is started without an intention of a user is reduced. In addition, electric power consumption (exhaustion) of the power source (6) in the first range (R1) can be suppressed.

An electric tool (1) of an eighth aspect referring to any one of the first to seventh aspects further includes an interruption mechanism (B1) configured to restrict the rotation of the output shaft (3) by an electrical cut-off in the restriction range (R0). With the eighth aspect, for example, the rotation of the output shaft (3) is restricted by a simple configuration as compared to, for example, the case where the rotation of the output shaft (3) is restricted by the mechanical lock.

An electric tool (1) of a ninth aspect referring to any one of the first to eighth aspects further includes a lock mechanism (C1) configured to restrict the rotation of the output shaft (3) by a mechanical lock in the restriction range (R0). The ninth aspect enables the possibility that the output shaft (3) rotates to be reduced, for example, manually, and enables the electric tool (1) to be used for manual tightening.

An electric tool (1) of a tenth aspect referring to any one of the first to ninth aspects further includes an operating unit (10). The operating unit (10) is configured to receive an operation input to switch the operation range to the restriction range (R0) or a derestriction range (R3) in which rotation restriction of the output shaft (3) is removed. With the tenth aspect, convenience is further improved.

Note that constituent elements according to the second to tenth aspects are not essential constituent elements for the electric tool (1) but may be omitted as appropriate.

REFERENCE SIGNS LIST

1 Electric Tool
2 Tip Tool
3 Output Shaft
4 Controller
5 Electric Motor
6 Power Source
80 Pressure-Sensitive Sensor
10 Operating Unit
B1 Interruption mechanism
C1 Lock Mechanism
P1 Contact Part
R0 Restriction Range
R1 First Range
R2 Second Range
R3 Derestriction Range

The invention claimed is:

1. An electric tool comprising:

an output shaft configured to hold a tip tool and be rotated by motive power provided from an electric motor with the output shaft holding the tip tool; and a controller configured to control rotation of the output shaft in accordance with pressing force in a direction from a tip end of the tip tool toward the output shaft, the electric tool having, as an operation range, a restriction range in which the rotation of the output shaft is restricted in a state where the pressing force is less than or equal to a prescribed value, the restriction range including at least a first range and a second range, the first range being a range in which the rotation of the output shaft is restricted by at least one of a mechanical lock or an electrical cut-off and the output shaft is in a non-rotatable state, and the second range being a range in which the non-rotatable state is released and the motive power of the electric motor is maintained at zero.

2. The electric tool of claim 1, wherein the prescribed value is greater than a value of a self-weight of the electric tool.

3. The electric tool of claim 2, further comprising a pressure-sensitive sensor configured to sense the pressing force.

4. The electric tool of claim 3, wherein the controller is configured to acquire an output value as a sensing result of the pressing force from the pressure-sensitive sensor, and the controller is configured, when determining that the output value is less than or equal to a threshold, to restrict the rotation of the output shaft.

5. The electric tool of claim 4, the controller is configured, when determining that the output value is less than or equal to the threshold, to mechanistically interrupt transmission of the motive power from the electric motor to the output shaft to restrict the rotation of the output shaft.

6. The electric tool of claim 1, further comprising a pressure-sensitive sensor configured to sense the pressing force.

7. The electric tool of claim 6, wherein the controller is configured to acquire an output value as a sensing result of the pressing force from the pressure-sensitive sensor, and the controller is configured, when determining that the output value is less than or equal to a threshold, to restrict the rotation of the output shaft.

8. The electric tool of claim 7, wherein the controller is configured, when determining that the output value is less than or equal to the threshold, to mechanistically interrupt transmission of the motive power from the electric motor to the output shaft to restrict the rotation of the output shaft.

9. The electric tool of claim 1, wherein the electric motor is configured to be supplied with electric power from a power source and give the motive power to the output shaft, and in the first range, a contact part between the electric motor and the power source is opened to achieve the electrical cut-off.

10. The electric tool of claim 1, further comprising an interruption mechanism configured to restrict the rotation of the output shaft by an electrical cut-off in the restriction range.

11. The electric tool of claim 1, further comprising a lock mechanism configured to restrict the rotation of the output shaft by a mechanical lock in the restriction range.

12. The electric tool of claim 1, further comprising an operating unit configured to receive an operation input to switch the operation range to the restriction range or a derestriction range in which rotation restriction of the output shaft is removed.

* * * * *